(12) United States Patent
Maruyama et al.

(10) Patent No.: US 9,880,579 B2
(45) Date of Patent: Jan. 30, 2018

(54) CONTROLLER, METHOD FOR CONTROLLING ELECTRICAL DEVICE, DEVICE CONTROL SYSTEM, AND PROGRAM

(71) Applicant: Mitsubishi Electric Corporation, Tokyo (JP)

(72) Inventors: Ichiro Maruyama, Tokyo (JP); Masaaki Yabe, Tokyo (JP); Satoshi Minezawa, Tokyo (JP); Toshiaki Yoshikawa, Tokyo (JP); Hirotoshi Yano, Tokyo (JP); Daisuke Iizawa, Tokyo (JP); Kenichiro Tanaka, Tokyo (JP); Takashi Ogino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 178 days.

(21) Appl. No.: 14/890,924

(22) PCT Filed: May 16, 2014

(86) PCT No.: PCT/JP2014/063096
§ 371 (c)(1),
(2) Date: Nov. 13, 2015

(87) PCT Pub. No.: WO2014/188979
PCT Pub. Date: Nov. 27, 2014

(65) Prior Publication Data
US 2016/0103461 A1    Apr. 14, 2016

(30) Foreign Application Priority Data
May 24, 2013 (JP) .................................. 2013-109570

(51) Int. Cl.
*H01H 35/00* (2006.01)
*G05F 1/66* (2006.01)
(Continued)

(52) U.S. Cl.
CPC ............. *G05F 1/66* (2013.01); *G05B 13/021* (2013.01); *G05B 15/02* (2013.01);
(Continued)

(58) Field of Classification Search
CPC ......... G05F 1/66; G05B 13/021; G05B 15/02; G05B 19/0426
(Continued)

(56) References Cited

U.S. PATENT DOCUMENTS

2004/0158541 A1*  8/2004  Notarianni ............. G06Q 50/06
                                                       705/412
2008/0154546 A1*  6/2008  Kato ....................... F23N 5/203
                                                       702/187
(Continued)

FOREIGN PATENT DOCUMENTS

JP    2000-224765 A    8/2000
JP    2003-111311 A    4/2003
(Continued)

OTHER PUBLICATIONS

International Search Report of the International Searching Authority dated Jun. 10, 2014 for the corresponding international application No. PCT/JP2014/063096 (and English translation).

(Continued)

*Primary Examiner* — Thomas Skibinski
(74) *Attorney, Agent, or Firm* — Posz Law Group, PLC

(57) ABSTRACT

A controller for controlling electrical devices in a dwelling is configured to display an energy-saving mode setting screen on a display that is a touch panel or the like in accordance with an operation by a user. Then, the controller is configured to receive a designation of a condition for an energy-saving control on the electrical devices in the dwelling on the energy-saving mode setting screen. Then, the controller is configured to set the respective energy-saving (Continued)

modes of the electrical devices via a home network based on the received condition.

9 Claims, 13 Drawing Sheets

(51) Int. Cl.
*H02J 3/14* (2006.01)
*H02J 13/00* (2006.01)
*G05B 13/02* (2006.01)
*G05B 15/02* (2006.01)
*G05B 19/042* (2006.01)

(52) U.S. Cl.
CPC ............ *G05B 19/0426* (2013.01); *H02J 3/14* (2013.01); *H02J 13/0079* (2013.01); *G05B 2219/2639* (2013.01); *G05B 2219/2642* (2013.01); *H02J 2003/143* (2013.01); *Y02B 70/3225* (2013.01); *Y02B 70/3241* (2013.01); *Y02B 70/3266* (2013.01); *Y04S 20/222* (2013.01); *Y04S 20/227* (2013.01); *Y04S 20/242* (2013.01)

(58) Field of Classification Search
USPC .................. 307/126, 116; 702/187; 700/278
See application file for complete search history.

(56) References Cited

U.S. PATENT DOCUMENTS

| 2010/0070093 | A1* | 3/2010 | Harrod ................ F24F 11/0086 700/278 |
| 2013/0020871 | A1 | 1/2013 | Takehara et al. |

FOREIGN PATENT DOCUMENTS

| JP | 2008-092680 A | 4/2008 |
| JP | 2008-241800 A | 10/2008 |
| JP | 2009-270764 A | 11/2009 |
| JP | 2009-278796 A | 11/2009 |
| JP | 2012-019579 A | 1/2012 |
| JP | 2012-090059 A | 5/2012 |
| JP | 2013-102577 A | 5/2013 |
| WO | 2011/125941 A1 | 10/2011 |

OTHER PUBLICATIONS

Office Action dated Sep. 24, 2013 issued in corresponding JP patent application No. 2013-109570 (and partial English translation).
Office Action dated Jan. 14, 2014 issued in corresponding JP patent application No. 2013-109570 (and partial English translation).
Office Action dated Jun. 2, 2015 issued in corresponding JP patent application No. 2014-164440 (and partial English translation).

* cited by examiner

DEVICE MANAGEMENT TABLE

| DEVICE ID | DEVICE NAME | INSTALLATION LOCATION | OPERATION STATE | AUTOMATIC CONTROL FLAG | ENERGY-SAVING MODE |
|---|---|---|---|---|---|
| 1 | A/C | LIVING ROOM | AIR COOLING (SET TEMP. 26°C) | OFF | HIGH |
| 2 | A/C | BEDROOM | AIR COOLING (SET TEMP. 26°C) | OFF | HIGH |
| 3 | A/C | CHILDREN'S ROOM | AIR COOLING (SET TEMP. 26°C) | OFF | HIGH |
| 4 | EcoCute | KITCHEN | STOPPED | OFF | LOW |
| 5 | TV | LIVING ROOM | ON | OFF | NONE |
| : | : | : | : | : | : |

FIG. 4

ELECTRICITY COST TABLE

| MONTH AND YEAR | TARGET AMOUNT | ACTUAL AMOUNT |
|---|---|---|
| JAN. 2012 | 10,000 YEN | 9,800 YEN |
| : | : | : |
| DEC. 2012 | 9,000 YEN | 9,200 YEN |
| JAN. 2013 | 9,000 YEN | 8,900 YEN |
| FEB. 2013 | 9,000 YEN | 9,000 YEN |
| MAR. 2013 | 7,000 YEN | 6,900 YEN |
| APR. 2013 | 6,000 YEN | 1,200 YEN |
| MAY 2013 | 5,000 YEN | 0 YEN |
| : | : | : |

FIG. 15

DEVICE MANAGEMENT TABLE

| DEVICE ID | DEVICE NAME | INSTALLATION LOCATION | OPERATION STATE | AUTOMATIC CONTROL FLAG | ENERGY-SAVING MODE | PRIORITY LEVEL |
|---|---|---|---|---|---|---|
| 1 | A/C | LIVING ROOM | AIR COOLING (SET TEMP. 26°C) | OFF | HIGH | 3 |
| 2 | A/C | BEDROOM | AIR COOLING (SET TEMP. 26°C) | OFF | HIGH | 2 |
| 3 | A/C | CHILDREN'S ROOM | AIR COOLING (SET TEMP. 26°C) | OFF | HIGH | 1 |
| 4 | EcoCute | KITCHEN | STOPPED | OFF | LOW | NONE |
| 5 | TV | LIVING ROOM | ON | OFF | NONE | NONE |
| ⋮ | ⋮ | ⋮ | ⋮ | ⋮ | ⋮ | ⋮ |

CONTROLLER, METHOD FOR CONTROLLING ELECTRICAL DEVICE, DEVICE CONTROL SYSTEM, AND PROGRAM

CROSS REFERENCE TO RELATED APPLICATIONS

This application is a U.S. national stage of International Patent Application No. PCT/JP2014/063096 filed on May 16, 2014, which claims priority to Japanese Patent Application No. 2013-109570 filed on May 24, 2013, the contents of which are incorporated herein by reference.

TECHNICAL FIELD

The present disclosure relates to a controller, an electrical device control method, a device control system, and a program for controlling electrical devices in a residential house.

BACKGROUND ART

Systems for connecting domestic electrical devices to a communication network and collectively managing the electrical devices using a controller, such as a HEMS (home energy management system), are known. For example, Patent Literature 1 describes a system in which a controller (electric power management device) predicts the power usage of electric devices and conducts an energy-saving control on the electrical devices based on a set target.

CITATION LIST

Patent Literature

Patent Literature 1: Unexamined Japanese Patent Application Kokai Publication No. 2012-019579.

SUMMARY OF INVENTION

Technical Problem

The system described in Patent Literature 1 simply conducts an energy-saving control on the electrical devices to achieve a set target. There is no choice of energy-saving control schemes and conducting an energy-saving control reflecting the user's preferences is difficult.

The present disclosure is made with the view of the above situation and an objective of the disclosure is to provide a controller, an electrical device control method, a device control system, and a program that can realize an energy-saving control reflecting the user's preferences.

Solution to Problem

In order to achieve the above objective, the controller of the present disclosure includes:

an energy-saving receiver configured to receive from a user a designation of a condition for an energy-saving control of an electrical device in a dwelling; and a device controller configured to set an energy-saving mode of the electrical device based on the condition received by the energy-saving receiver.

Advantageous Effects of Invention

According to the present disclosure, the designation of the condition for the energy-saving control of the electrical device is received from the user and the energy-saving mode of the electrical device is set based on the received condition. Thus, an energy-saving control reflecting the user's preferences is practicable.

BRIEF DESCRIPTION OF DRAWINGS

FIG. 4 is an illustration showing an example of a configuration of an electricity cost table;

FIG. 15 is an illustration showing an configuration example of the device management table in another embodiment.

DESCRIPTION OF EMBODIMENTS

An embodiment of the present disclosure is described in detail below with reference to the drawings. Here, the same or corresponding components are referred to by the same reference numbers in the figures.

Figure 1:
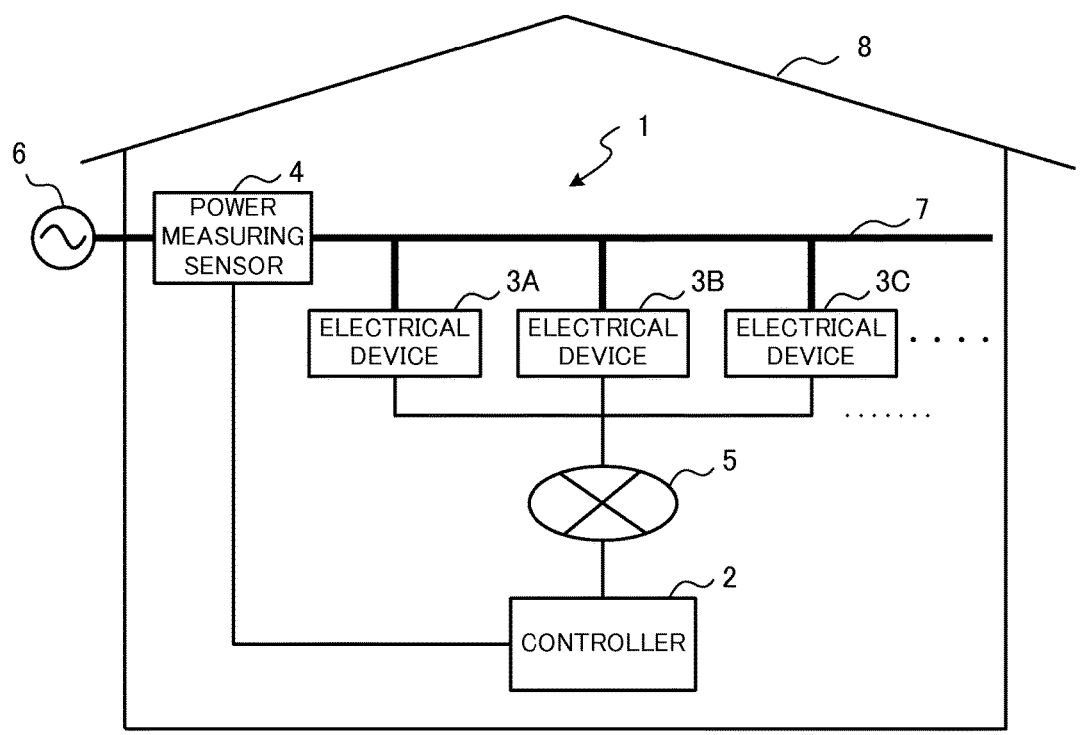
FIG. 1 is an illustration showing the configuration of a device control system according to an embodiment of the present disclosure.

FIG. 1 is an illustration showing the entire configuration of a device control system 1 according to an embodiment of the present disclosure. The device control system 1 is a system for monitoring the states of electrical devices 3 (3A, 3B, 3C, . . . ) in a dwelling 8 and controlling the operations of the electrical devices 3. The device control system 1 includes a controller 2, the electrical devices 3, and a power measuring sensor 4.

Figures 2, 3:
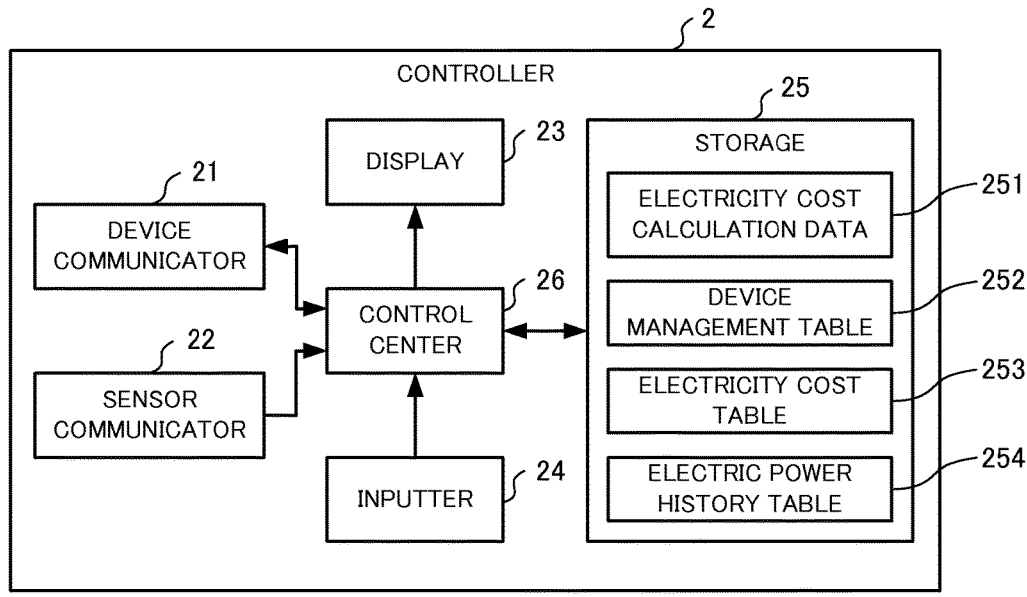
FIG. 2 is a block diagram showing the configuration of a controller.
FIG. 3 is an illustration showing an example of a configuration of a device management table.

The controller 2 communicates with the electrical devices 3 in the dwelling 8 via a home network 5 to manage the electrical devices 3. Furthermore, the controller 2 is connected to the power measuring sensor 4. The controller 2 includes, as shown in FIG. 2, a device communicator 21, a sensor communicator 22, a display 23, an inputter 24, a storage 25, and a control center 26.

The device communicator 21 includes, for example, a wireless communication interface and conducts data communication with the electrical devices 3 via the home network 5 under the control of the control center 26.

The sensor communicator 22 is an interface for connecting to the power measuring sensor 4, and acquires and outputs to the control center 26 the value of the power consumption measured by the power measuring sensor 4 at predetermined time intervals (for example, every 30 seconds). Here, the power measuring sensor 4 may be connected to the controller 2 via the home network 5. In such a case, the device communicator 21 may acquire the value of the power consumption from the power measuring sensor 4 via the home network 5.

The display 23 includes a liquid crystal panel or the like and displays various screens and the like for managing the electrical devices 3 under the control of the control center 26.

The inputter 24 is, for example, a touch panel and receives input of operations from a user. For example, when a touch panel is used as the inputter 24, a flat transparent capacitance sensor detecting the change in capacitance is mounted over the liquid crystal display. As the capacitance sensor detects any contact (pressure) of a finger tip of the user, a specific pen, or the like to the touch surface (the display screen of the liquid crystal display for the user), information of the position (coordinate data) is output to the control center 26. The control center 26 determines the content of the user operation based on the position information. As the user conducts an input operation via the inputter 24, signals corresponding to the operation content are output to the control center 26.

The storage 25 functions as a so-called secondary storage (auxiliary storage) and includes, for example, a readable/writable nonvolatile semiconductor memory such as a flash memory. The storage 25 stores a list of management-target electrical devices 3, a list of operation contents on the electrical devices 3, screen data for managing the electrical devices 3, programs executed by the control center 26, and the like. Furthermore, the storage 25 includes electricity cost calculation data 251, a device management table 252, an electricity cost table 253, and an electric power history table 254.

The electricity cost calculation data 251 are data including parameters for calculating the monthly electricity costs based on the electric energy. Here, if the electricity rate varies depending on the time slots, the electricity cost calculation data 251 include a parameter for calculating the corresponding electricity cost on the time slot basis. In this embodiment, the electricity cost calculation data 251 corresponding to and proper for the area to which the dwelling 8 belongs are stored in the storage 25.

Various kinds of information regarding the electrical devices 3 are registered in the device management table 252. More specifically, as shown in FIG. 3, the device management table 252 stores, for each electrical device 3, a device ID, a device name, an installation location, an operation state, an automatic control flag indicating whether the device is automatically controlled, a currently set energy-saving mode, and the like.

Referring back FIG. 2, target amounts and actual amounts of the monthly electricity costs of the dwelling 8 are registered in the electricity cost table 253 as shown in FIG. 4. In this example, it is assumed that today falls in early April of 2013. Therefore, the actual amount for April of 2013 is "1200 yen", which is extremely lower than the target amount "6000 yen". Furthermore, there are no actual amounts for May of 2013 and subsequent months; therefore, "0 yen" is set.

Referring back FIG. 2, the electric power history table 254 accumulates and stores the value of the power consumption measured by the power measuring sensor 4 along with the measurement date and time.

The control center 26 includes a CPU (central processing unit), a ROM (read only memory), a RAM (random access memory), and the like (none of them are shown). Using the RAM as the work memory, the CPU executes various programs stored in the ROM and the storage 25 as appropriate to control the entire controller 2.

For example, the control center 26 stores the power consumption acquired from the power measuring sensor 4 via the sensor communicator 22 in the electric power history table 254 as needed. Furthermore, when the date changes, the control center 26 calculates the electricity cost for the current month based on the power consumption history stored in the electric power history table 254 and the electricity cost calculation data 251 and updates the actual amount for the current month in the electricity cost table 253.

Furthermore, the control center 26 receives a designation of an energy-saving mode, that is, a condition for an energy-saving control from the user via the inputter 24. In other words, the control center 26 and the inputter 24 of the controller 2 cooperate to function as the energy-saving receiver of the present disclosure.

Furthermore, the control center 26 controls the operation of the electrical devices 3 based on the received energy-saving mode. In other words, the control center 26 of the controller 2 functions as the device controller of the present disclosure.

Furthermore, the control center 26 receives input of target amounts of the electricity costs of the dwelling 8 from the user via the inputter 24 and registers the target amounts in the electricity cost table 253. In other words, the control center 26 and the inputter 24 of the controller 2 cooperate to function as the target receiver of the present disclosure. The above tasks executed by the control center 26 are described in detail below.

Referring back to FIG. 1, the electrical devices 3 are devices used in the dwelling 8 such as an A/C (air conditioner), a lighting apparatus, a rice cooker, an IH cooker, a dehumidifier, and a television. The electrical devices 3 are connected to a power line 7 supplying electric power from a commercial power source 6. Furthermore, the electrical devices 3 can be set to two-levels of energy-saving modes "LOW" and "HIGH." Operating in accordance with the set energy-saving mode, the electrical devices 3 can operate with a power consumption lower than the usual power consumption.

For example, when an electrical device 3 is an A/C and set to the energy-saving mode "LOW," this A/C is controlled not to operate with a power consumption equal to or higher than 80% of the rated power. Furthermore, when an A/C is set to the energy-saving mode "HIGH," this A/C is controlled not to operate with an electric power equal to or higher than 70% of the rated power.

The power measuring sensor 4 is installed on the power line 7 connecting the commercial power source 6 and the electrical devices 3 and periodically (for example, every 30 seconds) measures the total power consumption of the electrical devices 3 in the dwelling 8.

The operation of the device control system 1 having the above-described configuration is described hereafter.

(Energy-Saving Mode Setting Process)

Figure 5:
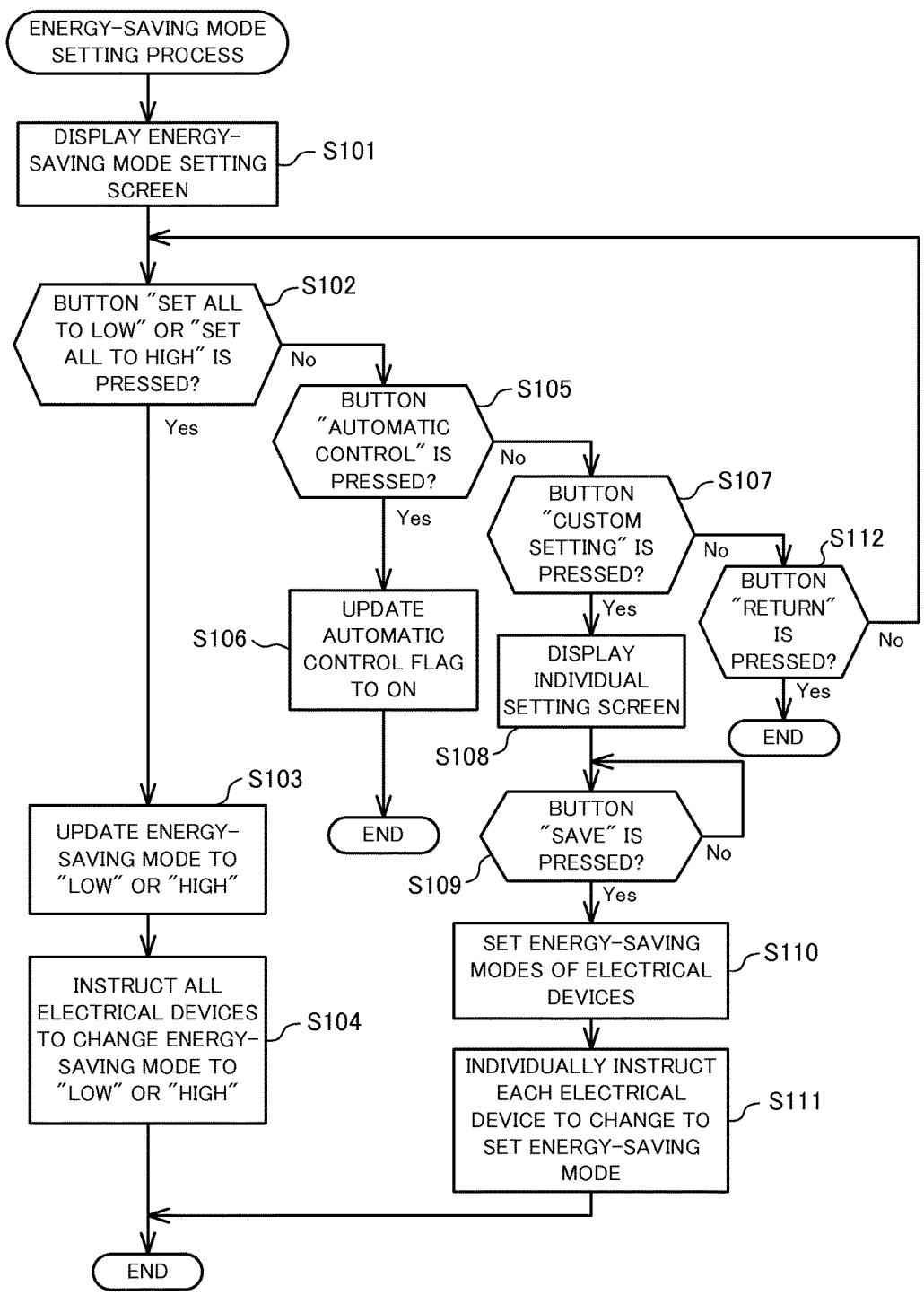
FIG. 5 is a flowchart for explaining the operation in an energy-saving mode setting process.

As the controller 2 is activated, the control center 26 displays a non-illustrated menu screen on the display 23. For example, the user operates the inputter 24 (a touch panel) to press a button "SET ENERGY-SAVING MODE" on the menu screen. In response to this pressing operation, the controller 2 executes the energy-saving mode setting process shown in FIG. 5.

Figure 6:
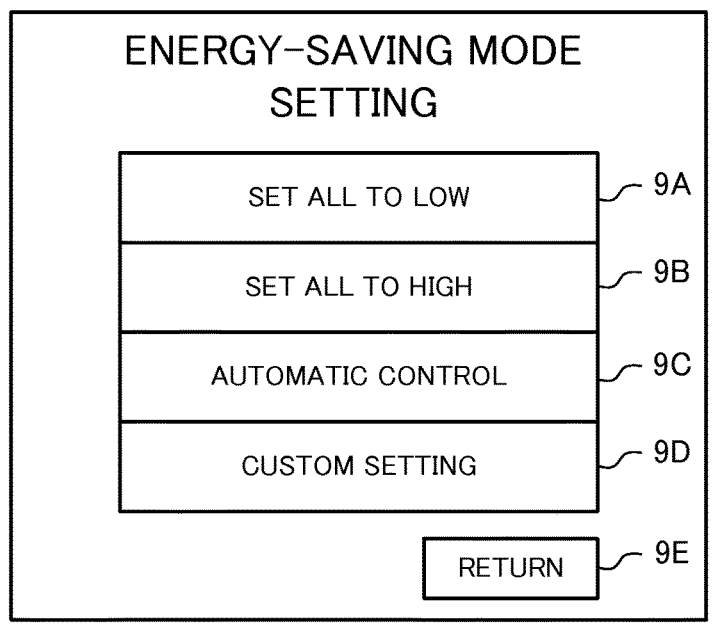
FIG. 6 is an illustration showing an example of an energy-saving mode setting screen.

As the energy-saving mode setting process starts, first, the control center 26 of the controller 2 displays an energy-saving mode setting screen shown in FIG. 6 on the display 23 (Step S101).

Referring back to FIG. 5, as the energy-saving mode setting screen is displayed, the control center 26 detects an operation by the user on the inputter 24 and determines whether a button "SET ALL TO LOW" 9A or a button "SET ALL TO HIGH" 9B is pressed (Step S102). If the button "SET ALL TO LOW" 9A or button "SET ALL TO HIGH" 9B is determined to be pressed (Step S102; Yes), the control center 26 updates the energy-saving modes of all the electrical devices 3 registered in the device management table 252 to "LOW" or "HIGH" (Step S103). Then, the control center 26 controls the device communicator 21 to send to all the management-target electrical devices 3 a signal giving an instruction to change the energy-saving mode to the energy-saving mode "LOW" or "HIGH" (Step S104). Upon a reception of the signal, the electrical devices 3 changes the respective energy-saving modes to "LOW" or "HIGH." Then, the control center 26 returns the display on the display 23 to the menu screen and the energy-saving mode setting screen ends.

If the button "SET ALL TO LOW" 9A or the button "SET ALL TO HIGH" 9B is determined not to be pressed (Step S102; No), the control center 26 determines whether a button "AUTOMATIC CONTROL" 9C on the energy-saving mode setting screen is pressed (Step S105). If the button "AUTOMATIC CONTROL" 9C is determined to be pressed (Step S105; Yes), the control center 26 updates the respective automatic control flags of the electrical devices 3 registered in the device management table 252 to ON (Step S106). Then, the control center 26 returns the display on the display 23 to the menu screen and the energy-saving mode setting screen ends.

Figure 7:
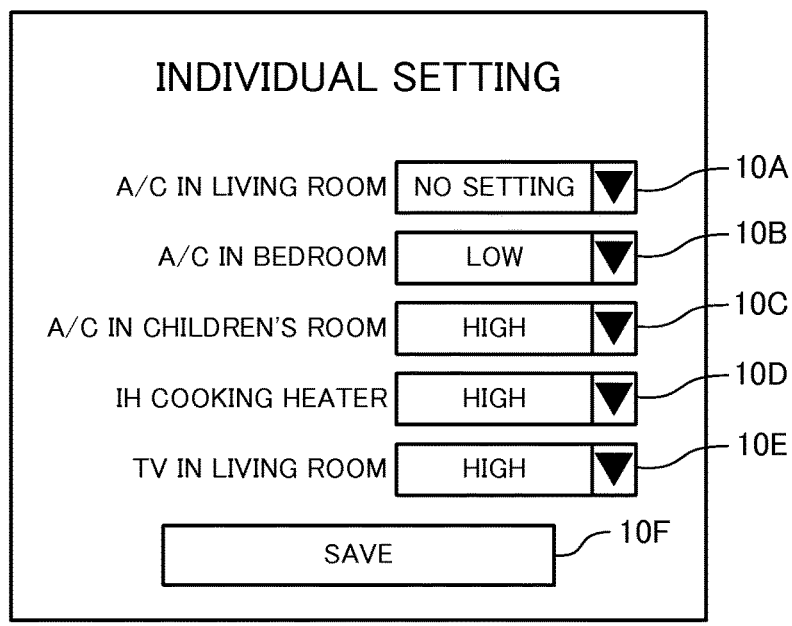
FIG. 7 is an illustration showing an example of an individual setting screen.

If the button "AUTOMATIC CONTROL" 9C is determined not to be pressed (Step S105; No), the control center 26 determines whether a button "CUSTOM SETTING" 9D on the energy-saving mode setting screen is pressed (Step S107). If the button "CUSTOM SETTING" 9D is determined to be pressed (Step S107; Yes), the control center 26 displays an individual setting screen shown in FIG. 7 (Step S108).

As the individual setting screen is displayed, the user selects an item in each of list boxes 10A to 10E on the screen to individually set the respective energy-saving modes of the electrical devices 3. Here, the item that can be selected in the list boxes 10A to 10E is only any one of "HIGH," "LOW," and "NO SETTING." After setting the energy-saving modes, the user presses a button "SAVE" 10F on the individual mode setting screen. If the control center 26 detects the button "SAVE" 10F being pressed (Step S109; Yes), the control center 26 updates the respective energy-saving modes of the electrical devices 3 in the device management table 252 based on the contents set on the individual setting screen (Step S110). Then, the control center 26 controls the device communicator 21 to send to each of the electrical devices 3 a signal giving an instruction to change the energy-saving mode to the set energy-saving mode (Step S111). Upon a reception of the signal, the electrical devices 3 change the respective energy-saving modes. Then, the control center 26 returns the display on the display 23 to the menu screen and the energy-saving mode setting screen ends.

If the button "CUSTOM SETTING" 9D on the energy-saving mode setting screen is determined not to be pressed in Step S107 (Step S107; No), the control center 26 determines whether a button "RETURN" 9E is pressed (Step S112). If the button "RETURN" 9E is determined to be pressed (Step S112; Yes), the control center 26 returns the display on the display 23 to the menu careen and the energy-saving mode setting screen ends. If the button "RETURN" is determined not to be pressed (Step S112; No), the process returns to Step S102.

As described above, by conducting simple operations from the controller 2, the user can set the respective energy-saving modes of the electrical devices 3 through the energy-saving mode setting process. Furthermore, it is possible to set an energy-saving mode for all the electrical devices 3 at one time or individually set the respective energy-saving modes of the electrical devices 3.

(Target Setting Process)

Figure 8:
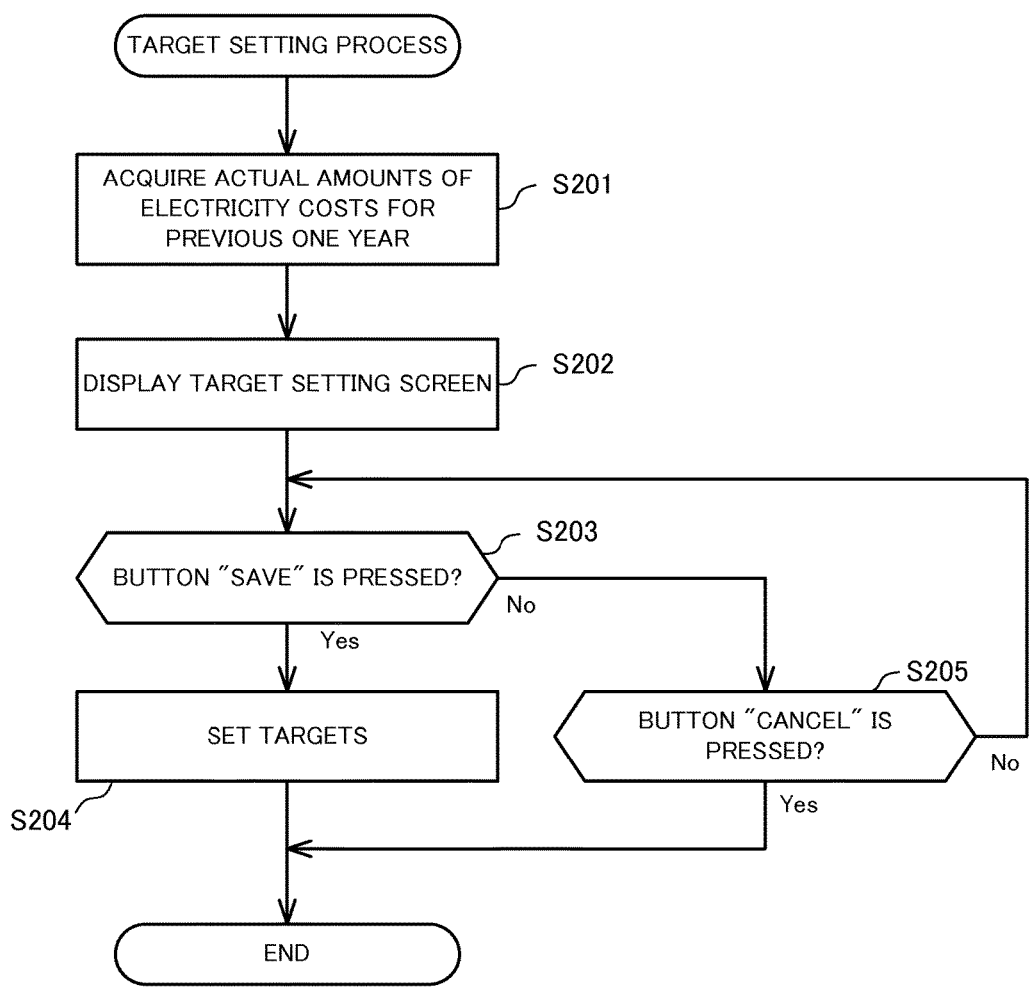
FIG. 8 is a flowchart for explaining the operation in a target setting process.

The target setting process is described hereafter. For example, the user operates the inputter 24 to press a button "SET TARGET" on a non-illustrated menu screen. In response to this pressing operation, the controller 2 executes the target setting process shown in FIG. 8.

As the target setting process starts, first, the control center 26 of the controller 2 acquires the actual amounts of the monthly electricity costs for the previous one year, that is, 12 months from the electricity cost table 253 (Step S201). Here, if the actual amounts for the previous one year cannot be acquired, the control center 26 may acquire the average actual amount of the monthly electricity costs for the previous one year of a dwelling equal in size to the dwelling 8 from a non-illustrated external server or the like via the Internet or the like.

Subsequently, the control center 26 displays a target setting screen shown in FIG. 9 on the display 23 (Step S202). In doing so, the control center 26 displays, in a yearly target setting area E1 and a monthly target setting area E2 on the target setting screen, shaded graphical representations of which sizes correspond to the actual amounts of the electricity costs acquired in Step S201 and white graphical representations equal in size to the shaded graphical representations and presenting the targets of the electricity costs for the next one year.

Figure 9:
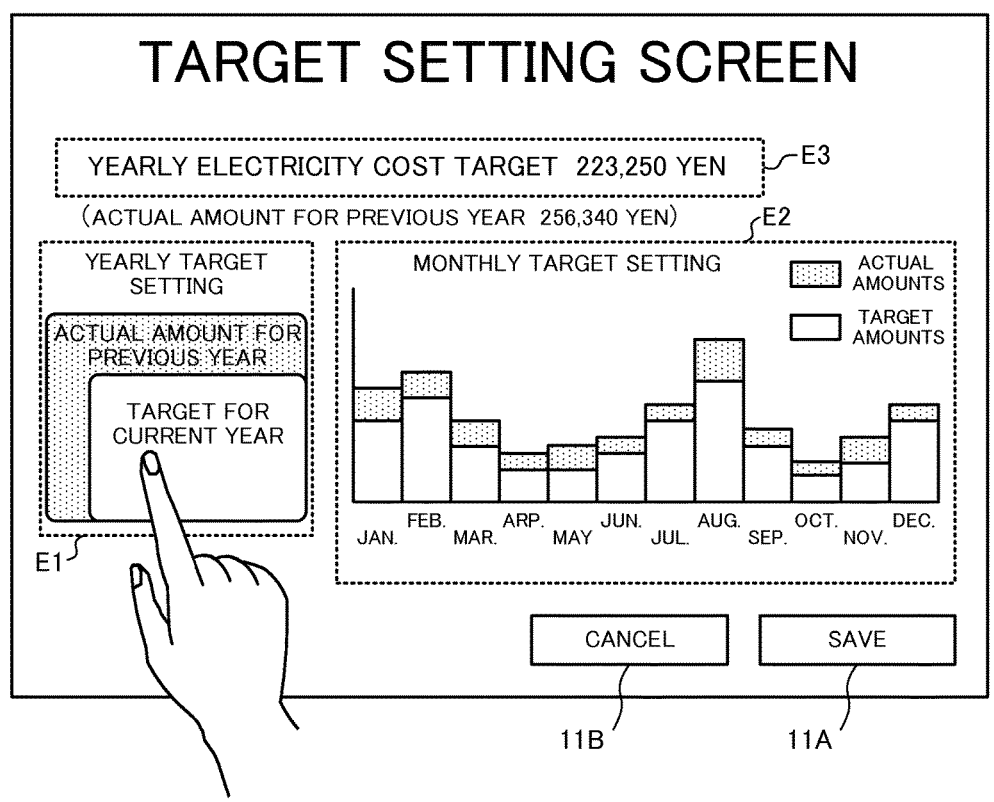
FIG. 9 is an illustration showing an example of the target setting screen.

By sliding a finger or the like as shown in FIG. 9, the user operates the inputter 24, which is a touch panel, to change the sizes of the white graphical representations in the areas E1 and E2 so as to set the target amounts of the electricity costs for the next one year. In doing so, since the actual amounts for the last one year are displayed in the areas E1 and E2, the user can set the target amounts while making a comparison with the past actual amounts. Here, the target amount of the electricity cost for the next entire one year to be set in the yearly target setting area E1 and the monthly target amounts for the next one year to be set in the monthly target setting area E2 are matched. As the size of the white graphical representation presenting a target amount in the area E1 is changed, the sizes of the white graphical representations presenting target amounts in the area E2 are accordingly changed as appropriate, and vice versa. Furthermore, in accordance with such an operation, the amount in a yearly electricity cost target area E3 is also appropriately changed.

After setting the target amounts, the user presses a button "SAVE" 11A. Referring back to FIG. 8, the control center 26 determines whether the button "SAVE" 11A is pressed (Step S203). If the button "SAVE" 11A is determined to be pressed (Step S203; Yes), the control center 26 registers the monthly target amounts for the next one year set on the target setting screen in the electricity cost table 253 (Step S204). Then, the control center 26 returns the display on the display 23 to the menu screen and the target setting process ends.

If the button "SAVE" 11A is determined not to be pressed (Step S203; No), the control center 26 determines whether a button "CANCEL" 11B is pressed (Step S205). If the button "CANCEL" 11B is determined to be pressed (Step S205; Yes), the control center 26 returns the display on the display 23 to the menu screen and the target setting screen ends.

As described above, by conducting simple operations on the target setting screen displayed on the display 23 of the controller 2, the user can set the target amounts of the electricity costs through the target setting process. Furthermore, since the actual amounts of the electricity costs are displayed on the target setting screen, the user can set the targets while making a reference to the past actual amounts.

(Automatic Control Process)

The automatic control process to control the energy-saving modes of the electrical devices 3 based on the targets set in the target setting process is described hereafter. While being powered on, the control center 26 of the controller 2 executes the automatic control process shown in the flowchart of FIG. 10.

First, the control center 26 determines whether a predetermined standby time (for example, one hour) has elapsed (Step S301). If the standby time has not elapsed (Step S301; No), the control center 26 puts the process on hold.

If the standby time has elapsed (Step S301; Yes), the control center 26 makes a reference to the device management table 252 and determines whether the respective automatic control flags of the electrical devices 3 are ON (Step S302). If the automatic control flags are not ON (Step S302; No), the control center 26 returns to the process in Step S301 without executing the subsequent control.

If the automatic control flags are ON (Step S302; Yes), the control center 26 executes the target achievement level determination process to determine the target achievement level indicating the possibility of achieving the target for the current month (Step S303).

Figure 11:
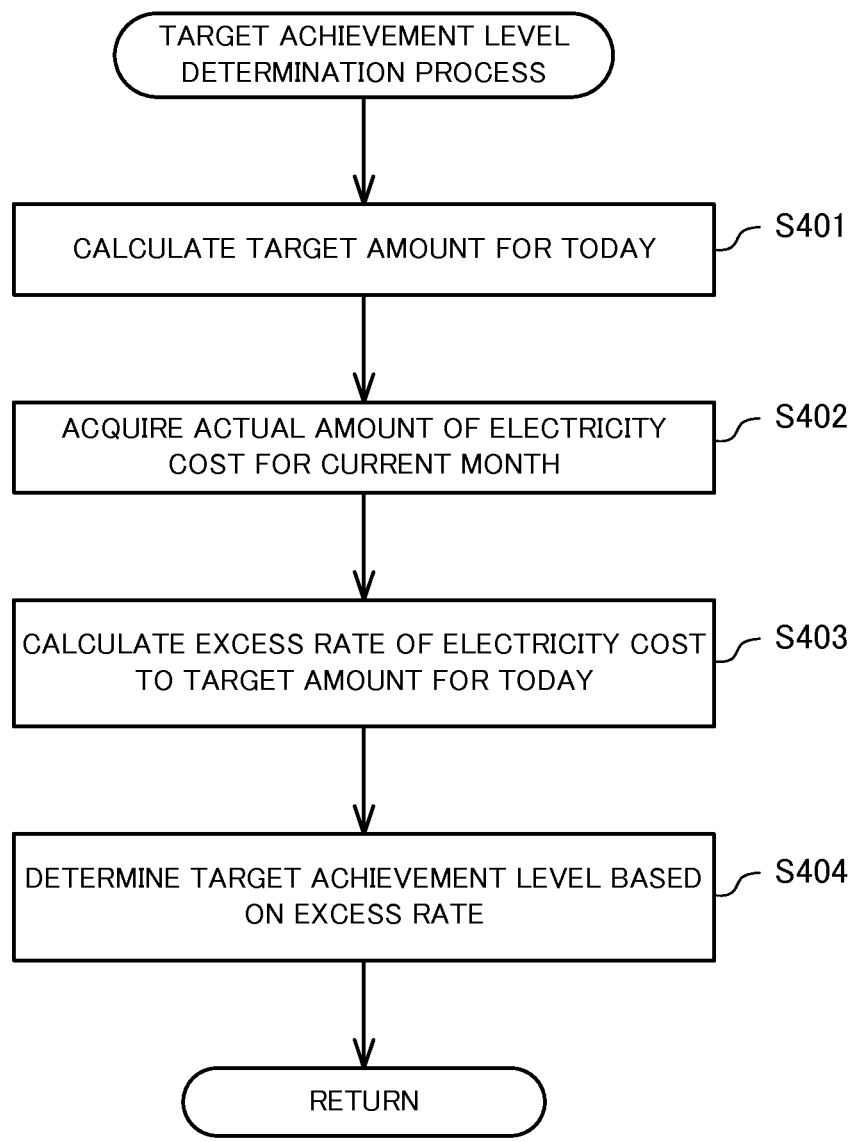
FIG. 11 is a flowchart for explaining the operation in a target achievement level determination process.

The target achievement level determination process is described in detail hereafter with reference to the flowchart of FIG. 11. First, the control center 26 calculates the target amount for today from the target amount of the electricity cost for the current month registered in the electricity cost table 253 (Step S401).

For example, the control center 26 calculates the target amount of the electricity cost for today using the formula below on the assumption that the daily power consumption stays nearly the same:

(Target amount for today)=(Target amount for the current month)×(the number of days elapsed in the current month)/(the number of days in the current month).

Subsequently, the control center 26 acquires the actual amount of the electricity cost for the current month from the electricity cost table 253 (Step S402).

Subsequently, the control center 26 calculates the excess rate of the electricity cost to the target amount for today (Step S403). More specifically, the control center 26 calculates the excess rate using the formula below in which X is the target amount calculated in Step S401 and Y is the actual amount of the electricity cost calculated in Step S402:

Excess rate (%)=100×(Y−X)/X.

Subsequently, the control center 26 determines the target achievement level presenting the possibility of achieving the target for the current month based on the calculated excess rate (Step S404). More specifically, the control center 26 determines that the target achievement level is "4" when the excess rate is lower than −10%, the target achievement level is "3" when the excess rate is not lower than −10% and lower than 0%, the target achievement level is "2" when the excess rate is not lower than 0% and lower than 10%, and the target achievement level is "1" when the excess rate is not lower than 10%. Here, the target achievement levels may further be subdivided. Then, the target achievement level determination process ends.

Referring back to FIG. 10, subsequently, the control center 26 determines whether the target achievement level is determined to be the highest level "4" in the target achievement level determination process (Step S304).

If the target achievement level is determined to be "4" (Step S304; Yes), there is sufficient room to achieve the target for the current month and the necessity for requiring respective energy-saving controls on the electrical devices 3 is low. Therefore, the control center 26 executes a process to cancel the energy-saving modes set for the electrical devices 3 (Step S305) and the process returns to Step S301. More specifically, the control center 26 updates the energy-saving modes of all the management-target electrical devices 3 registered in the device management table 252 to "NONE." Then, the control center 26 sends to all the management-target electrical devices 3 a signal giving an instruction to cancel the energy-saving modes.

If the target achievement level is not determined to be "4" (Step S304; No), the control center 26 determines whether the target achievement level is determined to be "3" in the target achievement level determination process (Step S306).

If the target achievement level is determined to be "3" (Step S306; Yes), the electrical devices 3 are controlled under the conditions suitable for achieving the target for the current month. Therefore, changing of the energy-saving modes is not necessary and the process returns to Step S301.

If the target achievement level is not determined to be "3" (Step S306; No), the control center 26 determines whether the target achievement level is determined to be "2" in the target achievement level determination process (Step S307).

If the target achievement level is determined to be "2" (Step S307; Yes), the current control conditions of the electrical devices 3 are insufficient for achieving the target. Therefore, the control center 26 executes a process to upregulate the respective energy-saving modes set for the electrical devices 3 by one level (Step S308) and the process returns to Step S301. More specifically, the control center 26 makes a reference to the device management table 252 and updates the energy-saving mode to "LOW" when the energy-saving mode "NO SETTING" is set for any of the electrical devices 3 and to "HIGH" when the energy-saving mode "LOW" is set, and sends to each of the electrical devices 3 a signal giving an instruction to change the energy-saving mode.

If the target achievement level is not determined to be "2" (Step S307; No), the target achievement level is the lowest level "1" and it is significantly difficult to achieve the target for the current month under the current control conditions of the electrical devices 3. Therefore, the control center 26 executes a process to change the energy-saving modes of all the electrical devices 3 to "HIGH" (Step S309) and the process returns to Step S301. More specifically, the control center 26 updates the energy-saving modes of all the electrical devices 3 registered in the device management table 252 to "HIGH." Then, the control center 26 sends to all the electrical devices 3 an instruction signal suggesting the change to the energy-saving mode "HIGH."

As described above, an energy-saving control on each of the electrical devices 3 can be conducted through the automatic control process without human intervention.

As described above, according to this embodiment, the controller 2 receives a designation of a condition for an energy-saving control (a designation of an energy-saving mode) from the user. Then, the controller 2 sets the energy-saving modes of the electrical devices 3 based on the received condition. Thus, an energy-saving control reflecting the user's preferences can be realized.

Furthermore, according to this embodiment, when the controller 2 receives an automatic control designation from the user, the controller 2 determines the target achievement level and sets the energy-saving modes of the electrical devices 3 based on the determined target achievement level. Therefore, the automatic controls of the electrical devices 3 can be realized without discomforting the user while still achieving the target.

For example, when the highest target achievement level is obtained and there is some degree of room to achieve the target, the controller 2 can cancel the energy-saving modes of the electrical devices 3 so as to make the user more comfortable.

When the lowest target achievement level is obtained and the achievement of the target is significantly difficult, the controller 2 can set the energy-saving modes of the electrical devices 3 to the highest, which highly possibly achieves the target.

The present disclosure is not limited to the above embodiment. Needless to say, various modifications can be made without departing from the gist of the present disclosure.

For example, in the above-described embodiment, the target achievement level is determined based on the excess rate of the electricity cost to the target amount for today in the target achievement level determination process. However, the target achievement level may be determined by predicting the electricity cost for the current month (at the end of the month) from the actual amount of the electricity cost through today and comparing the predicted electricity cost with the target amount for the current month.

Figure 12:
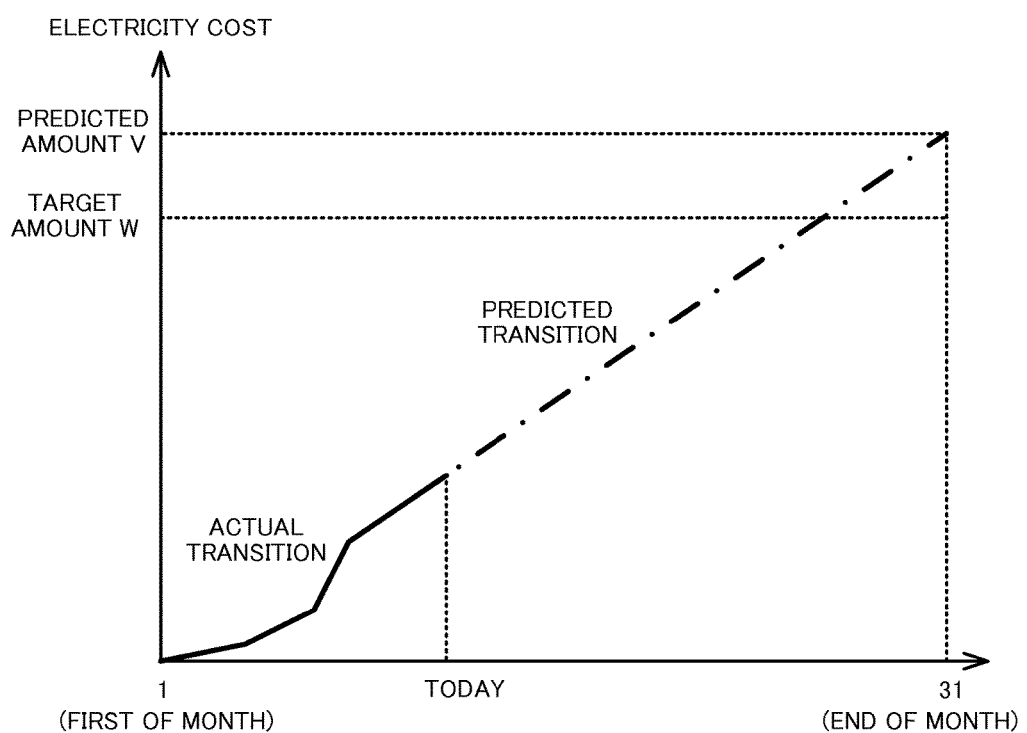
FIG. 12 is a chart showing an example of obtaining a predicted amount of the electricity cost for the current month.

For example, as shown in FIG. 12, the control center 26 predicts the future transition of the electricity cost as presented by the dash-dot line from the transition of the actual amount of the daily electricity cost from the first of the month through today as presented by the solid line using the method of least squares or the like to obtain a predicted amount V of the electricity cost for the current month. Here, the actual amount of the daily electricity cost through today may be calculated based on the history of power consumption stored in the electric power history table 254 and the electricity cost calculation data 251. Then, the control center 26 may calculate the excess rate of the predicted amount V to the target amount W for the current month using the formula below and determine the target achievement level based on this excess rate:

Excess rate (%)=100×(V−W)/W.

Here, any method can be used to obtain the above predicted amount V of the electricity cost for the current month and various applicable methods are available. For example, when the controller 2 can be connected to an external weather forecast system via the Internet and can acquire weather forecast information from the system, the predicted amount V may be obtained in consideration of the weather forecast information. Furthermore, when the controller 2 can obtain schedule information of the family of the dwelling 8 through user input operations or the like, the predicted amount V may be obtained in consideration of the schedule information.

Figure 13:
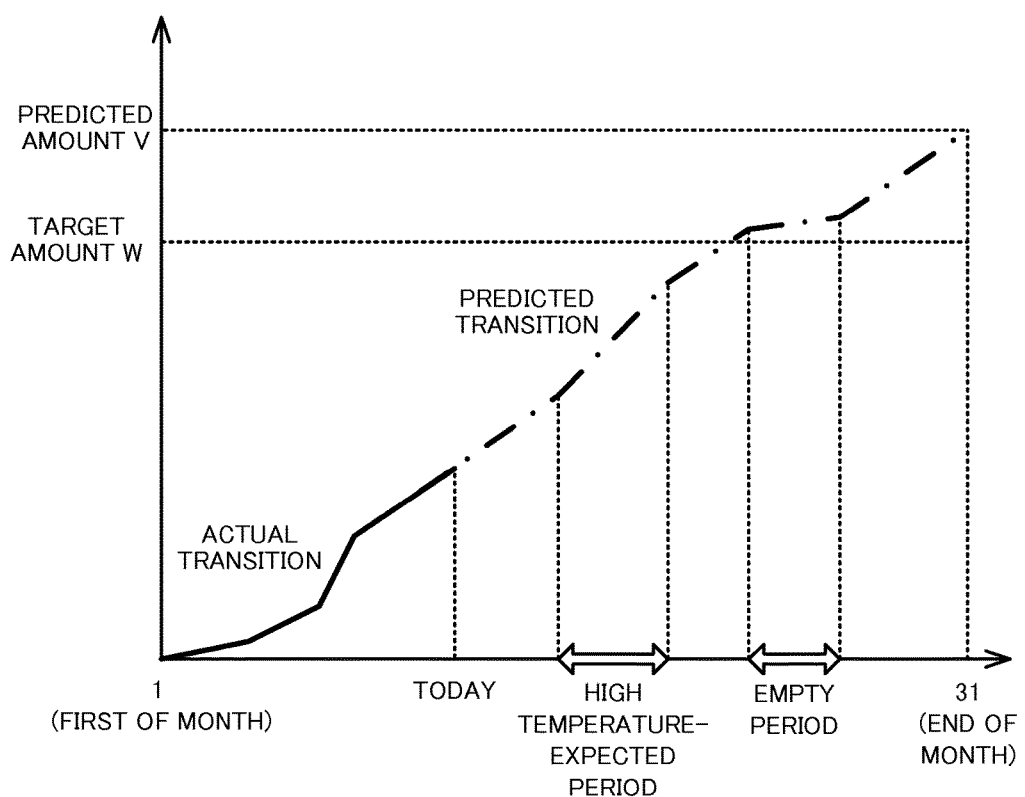
FIG. 13 is a chart showing an example of obtaining a predicted amount of the electricity cost for the current month using weather forecast information and schedule information.

Here, a case in which the controller 2 obtains the predicted amount V of the electricity cost in consideration of the weather forecast information and the schedule information is described with reference to FIG. 13. In this case, the control center 26 of the controller 2 identifies a period during which high temperatures are expected from the weather forecast information and predicts a higher increase rate in the actual amount of the electricity cost for this period as compared to other periods. Furthermore, the control center 26 identifies a period during which the dwelling 8 is empty due to a trip or the like from the schedule information and predicts a lower increase rate in the actual amount of the electricity cost for this period as compared to other periods. In this way, the monthly electricity cost can be predicted with accuracy.

Figure 10:
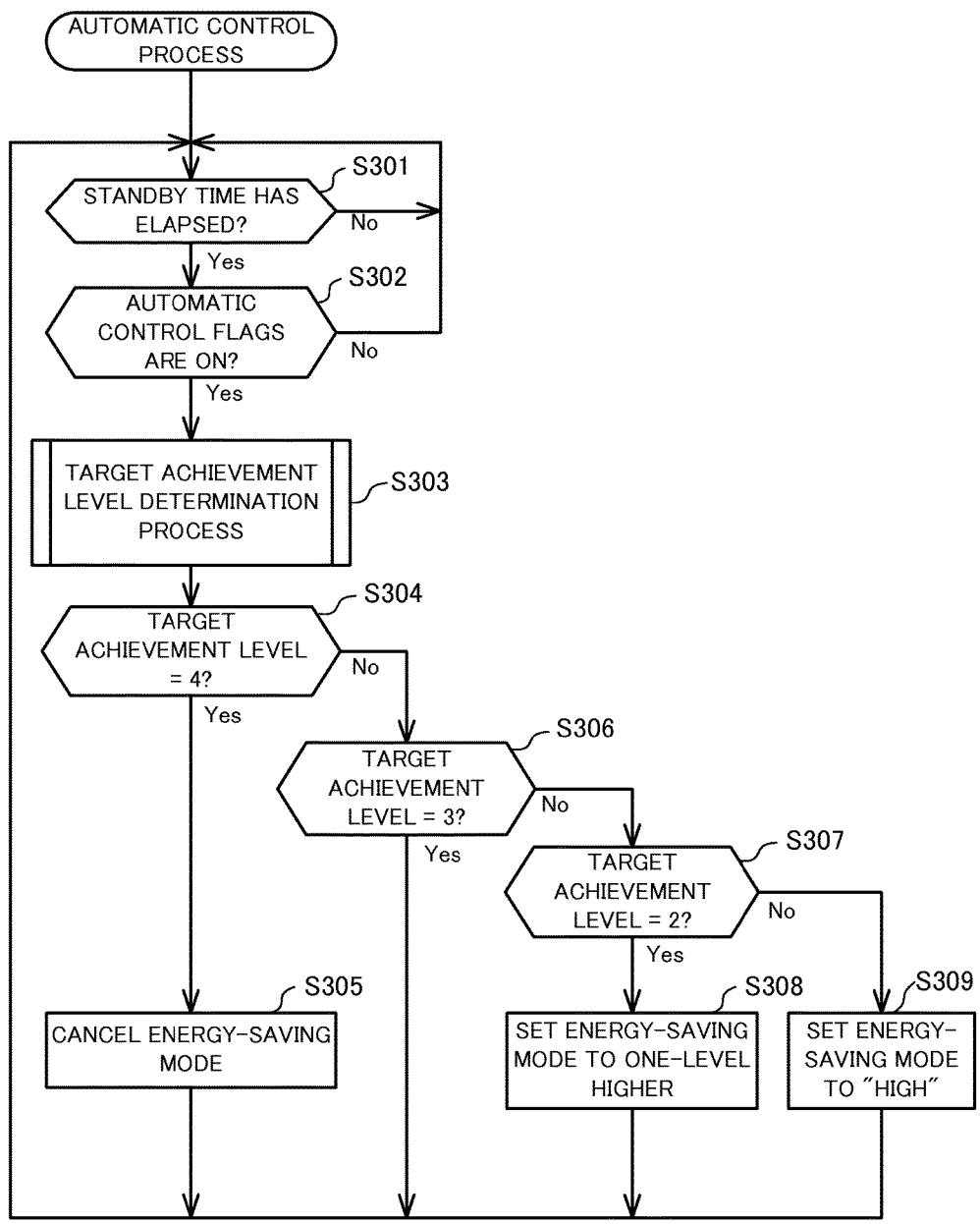
FIG. 10 is a flowchart for explaining the operation in the automatic control process.
Figure 14:
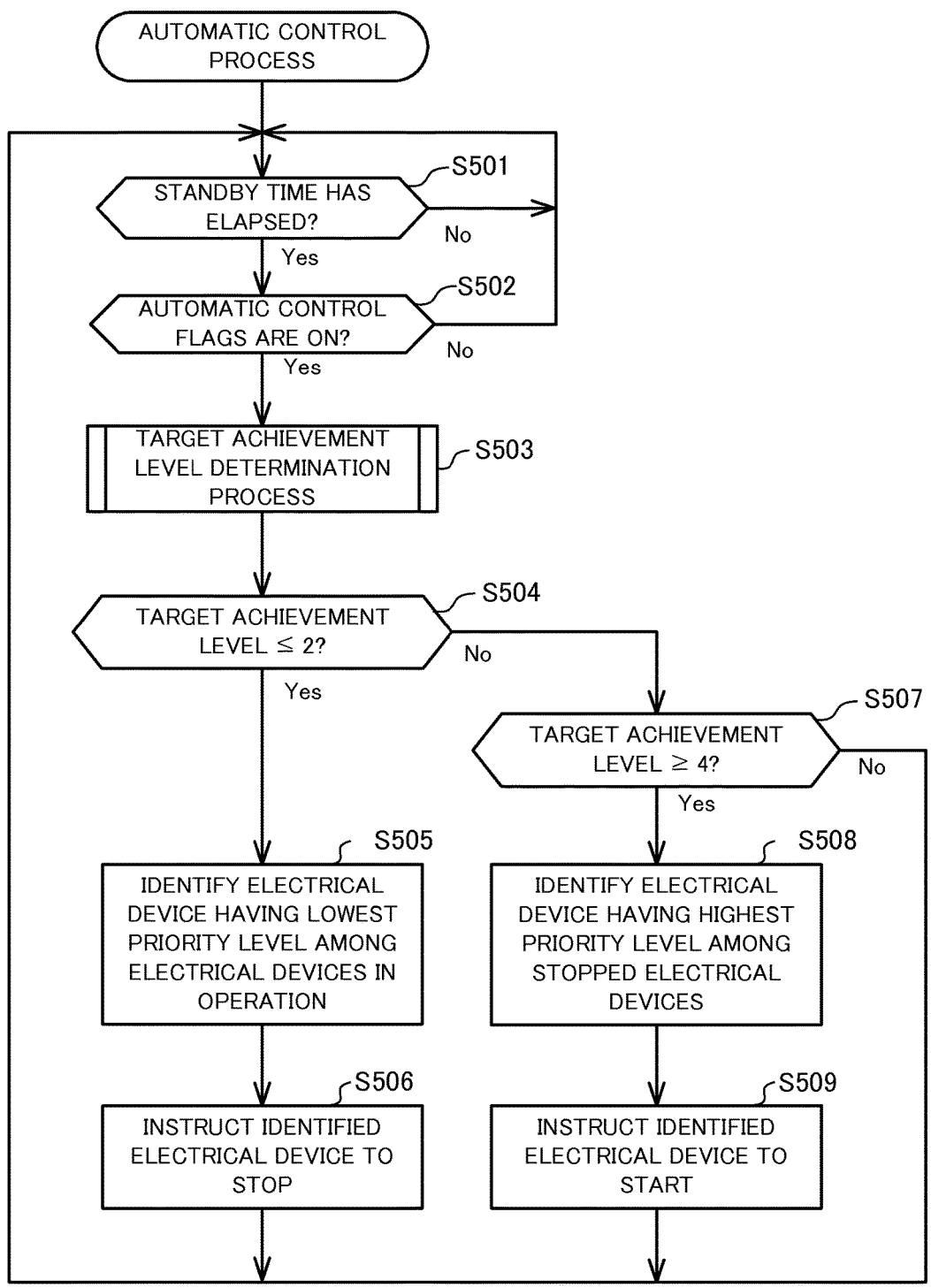
FIG. 14 is a flowchart for explaining the operation in the automatic control process in another embodiment.

Furthermore, priority levels to the electrical devices 3 may be set and the electrical devices 3 may be controlled based on the priority levels in the automatic control process. The automatic control process in such a case is described with reference to the flowchart of FIG. 14. However, substantially the same process as in the automatic control process shown in FIG. 10 is explained briefly as appropriate. Here, the priority levels are assumed to be preregistered in the device management table 252 of the controller 2 as shown in FIG. 15.

As the automatic control process starts, the control center 26 determines whether the standby time (for example, one hour) has elapsed (Step S501). If the standby time has not elapsed (Step S501; No), the control center 26 puts the process on hold.

If the standby time has elapsed (Step S501; Yes), the control center 26 determines whether the respective automatic control flags of the electrical devices 3 are ON (Step S502).

If the automatic control flags are ON (Step S502; Yes), the control center 26 executes the target achievement level determination process (Step S503). The processes up to here are substantially the same as the processes of Steps S301 to S303 in the automatic control process shown in FIG. 10.

Referring back to FIG. 14, subsequently, the control center 26 determines whether the target achievement level is determined to be equal to or lower than "2" (a first threshold) in the target achievement level determination process (Step S504).

If the target achievement level is determined to be equal to or lower than "2" (Step S504; Yes), the current control conditions of the electrical devices 3 are insufficient for achieving the target. Therefore, the control center 26 makes a reference to the device management table 252 and identifies the electrical device 3 having the lowest priority level among the electrical devices 3 currently in operation (Step S505). For example, when the information as shown in FIG. 15 is registered in the device management table 252 and all the electrical devices 3 are in operation, the A/C in the children's room is identified as the electrical device 3 having the lowest priority level.

Referring back to FIG. 14, subsequently, the control center 26 instructs the electrical device 3 identified in Step S505 to stop via the device communicator 21 (Step S506) and the process returns to Step S501.

If the target achievement level is not determined to be equal to or lower than "2" (Step S504; No), the control center 26 determines whether the target achievement level is determined to be equal to or higher than "4" (a second threshold) in the target achievement level determination process (Step S507).

If the target achievement level is determined to be equal to or higher than "4" (Step S507; Yes), there is sufficient room to achieve the target for the current month. Therefore, the control center 26 makes a reference to the device management table 252 and identifies the electrical device 3 having the highest priority level among the electrical devices 3 currently not in operation because of the instruction to stop in Step S506 (Step S508).

Then, the control center 26 instructs the electrical device 3 identified in Step S508 to start via the device communicator 21 (Step S509) and the process returns to Step S501.

If the target achievement level is not determined to be equal to or higher than "4" (Step S507; No), the target achievement level is "3" and the electrical devices 3 are controlled under the conditions suitable for achieving the target for the current month. Therefore, the electrical devices 3 are unnecessary to start or stop and the process returns to Step S501.

As described above, in this case, the electrical devices 3 are controlled according to the priority levels in the automatic control process, whereby an energy-saving control can be conducted while keeping the user comfortable to some extent. In this case, the electrical devices 3 are started or stopped for an energy-saving control. Alternatively, the energy-saving mode may be switched. Furthermore, when an electrical device 3 is started or stopped, another related electrical device 3 can be controlled upon the starting or stopping of the electrical device 3. For example, when the control center 26 instructs an A/C to start, the control center 26 may instruct a ventilation fan to stop upon the instructions to the A/C to start in order to improve the air conditioning effect.

Furthermore, in the above-described embodiment, the target amounts are set on the monthly electricity cost. However, the targets can be set for any period. For example, weekly target amounts may be set.

Furthermore, in the above-described embodiment, the target amounts are set on the electricity cost. However, the targets may be set in consideration of electricity sales when the dwelling 8 has a solar system or the like. In such a case, the actual amounts of electricity sales may be displayed in the yearly target setting area E1 and the monthly target setting area E2 on the target setting screen shown in FIG. 9. Furthermore, the target amount may be set on some other energy-related information such as the power consumption.

Furthermore, in the above-described embodiment, there are two levels of settable energy-saving modes "LOW" and "HIGH." However, a larger number of levels of settable energy-saving modes may be used.

Furthermore, the above-described control may be conducted by connecting a portable terminal such as a smartphone to the controller 2 and instructing the controller 2 from the portable terminal.

Furthermore, for example, the operation program defining the operation of the controller 2 according to this embodiment may be applied to an existing personal computer, an information terminal device, or the like so that the personal computer or the like can be functioned as the controller 2 according to the present disclosure.

Furthermore, the above program can be distributed by any method and, for example, may be stored in and distributed with a non-transitory computer-readable recording medium such as a CD-ROM (compact disk read only memory), a DVD (digital versatile disk), an MO (magneto-optical disk), and a memory card, or distributed via a communication network such as the Internet.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

The present application claims the priority based on Japanese Patent Application No. 2013-109570 and the contents of the priority application are all incorporated in the present application.

INDUSTRIAL APPLICABILITY

The present disclosure is preferably applicable to HEMS controllers and the like.

REFERENCE SIGNS LIST

1 Device control system
2 Controller
3 Electrical device
4 Power measuring sensor
5 Home network
6 Commercial power source
7 Power line
8 Dwelling
21 Device communicator
22 Sensor communicator
23 Display
24 Inputter
25 Storage
26 Control center
251 Electricity cost calculation data
252 Device management table
253 Electricity cost table
254 Electric power history table

The invention claimed is:

1. A controller comprising:
a device communicator configured to communicate with an electrical device within a dwelling via a communication network; and
a control center configured to display a target setting screen on a display for inputting a target amount of an electricity cost for the dwelling, and to control the electrical device via the communication network based on the target amount, wherein
the target setting screen includes a yearly target setting area and a monthly target setting area, the yearly target setting area receiving an input operation of a yearly target amount for an electricity cost, the monthly target setting area receiving an input operation of a monthly target amount for an electricity cost,
the control center is configured to change the target amount of one of the yearly target setting area and the monthly target setting area upon a change of the other, and the target setting screen is configured to display an actual averaged amount of electricity costs for similarly-sized dwellings as the dwelling, the actual average amount being acquired via the communication network.

2. The controller according to claim 1, wherein
the yearly target setting area and the monthly target setting area each are configured to display a graphical representation indicating the target amount, and
the control center is configured to change the yearly target amount or the monthly target amount by accepting an input operation of changing a size of the graphical representation in the yearly target setting area or the monthly target setting area, respectively.

3. The controller according to claim 1, wherein the target setting screen is configured to display an actual amount of the electricity cost.

4. The controller according to claim 3, wherein the yearly target setting area and the monthly target setting area each are configured to display the actual amount of the electricity cost.

5. The controller according to claim 1, wherein the target setting screen is configured to display the actual amount of the electricity cost and an actual amount of an electricity sale.

6. The controller according to claim 5, wherein the yearly target setting area and the monthly target setting area each are configured to display the actual amount of the electricity cost and the actual amount of the electricity sold.

7. The controller according to claim 1, wherein the control center is configured to determine a target achievement level presenting a possibility of achieving a target based on the actual amount of the electricity cost and the target amount of the electricity cost, and to control the electrical device based on the determined target achievement level.

8. A target setting method comprising:
   displaying a target setting screen on a display for inputting a target amount of an electricity cost for a dwelling;
   receiving, from a yearly target setting area or a monthly target setting area, respectively, an input operation of a yearly target amount for an electricity cost or a monthly target amount for an electricity cost; and
   changing the target amount of one of the yearly target setting area and the monthly target setting area upon a change of the other,
   wherein the target setting screen is configured to display an actual averaged amount of electricity costs for similarly-sized dwellings as the dwelling, the actual average amount being acquired via the communication network.

9. A non-transitory recording medium having stored therein a program for causing a computer to function as:
   a device communicator configured to communicate with an electrical device within a dwelling via a communication network; and
   a control center configured to display a target setting screen on a display for inputting a target amount of an electricity cost for the dwelling, and to control the electrical device via the communication network based on the target amount, wherein
   the target setting screen includes a yearly target setting area and a monthly target setting area, the yearly target setting area receiving an input operation of a yearly target amount for an electricity cost, the monthly target setting area receiving an input operation of a monthly target amount for an electricity cost,
   the control center is configured to change the target amount of one of the yearly target setting area and the monthly target setting area upon a change of the other, and
   the target setting screen is configured to display an actual averaged amount of electricity costs for similarly-sized dwellings as the dwelling, the actual average amount being acquired via the communication network.

* * * * *